US006385541B1

(12) United States Patent
Blumberg et al.

(10) Patent No.: US 6,385,541 B1
(45) Date of Patent: May 7, 2002

(54) GLOBAL POSITIONING-BASED REAL ESTATE DATABASE ACCESS DEVICE AND METHOD

(76) Inventors: Brad Wayne Blumberg, 9 Signal Hill Dr., Voorhees, NJ (US) 08043; Eric Blumberg, 103 S. Cambridge Ave., Ventnor, NJ (US) 08906

( * ) Notice: Subject to any disclaimer, the term of this patent is extended or adjusted under 35 U.S.C. 154(b) by 0 days.

(21) Appl. No.: 09/639,265

(22) Filed: Aug. 15, 2000

Related U.S. Application Data

(60) Provisional application No. 60/186,155, filed on Feb. 29, 2000.

(51) Int. Cl.$^7$ ................................................ G01C 21/00
(52) U.S. Cl. ....................... 701/213; 701/207; 701/208; 701/214
(58) Field of Search ................................. 701/200, 207, 701/208, 213, 214, 24; 340/991, 993; 342/357.06, 357.08, 357.13

(56) References Cited

U.S. PATENT DOCUMENTS

| | | | | |
|---|---|---|---|---|
| 5,032,989 A | | 7/1991 | Tornetta | |
| 5,594,425 A | * | 1/1997 | Ladner et al. | 340/825.06 |
| 5,684,859 A | | 11/1997 | Chanroo et al. | |
| 5,794,216 A | | 8/1998 | Brown | |
| 5,852,810 A | | 12/1998 | Sotiroff et al. | |
| 5,930,699 A | * | 7/1999 | Bhatia | 455/414 |
| 5,938,721 A | * | 8/1999 | Dussell et al. | 701/211 |
| 5,944,769 A | * | 8/1999 | Musk et al. | 701/201 |

OTHER PUBLICATIONS

"SnapTrack Awarded Patent For Locating or Tracking Wireless Devices Via Internet and Client–Server–Based Computer Networks" http://famulus.msnbc.com/famuluscom/businesswire01–23–050325.asp?sym=QCOM, Jan. 23, 2001.

"Lucent Technologies and Profilium Inc. Announce Alliance Agreement to Deploy Advanced Location–Based Mobile Advertising Solution", http://www.hoovershbh.hoovers.com/bin/story?StoryId=Com0p0bKbytiXmdi&FQ=c . . . %20L Jan. 23, 2001.

"The Meaning of Telematics", http://www.globaltelematics.com/telematics.htm Oct. 30, 2000.

HomeFinder—Find the Home That's Right for You from http://www.homefinder.com, no date.

Printout from http://www.homescape.com/buying/, no date.

zipRealty.com: The zipRealty.com Buyer's Advantage from http://www.ziprealty.com/buy_a_home/advantage.jsp, no date.

Homes for Sale—MSN HomeAdvisor from http://homeadvisor.msn.com/homes/overview.asp, no date.

Realtor.com: Real Estate—Find a new home and a realtor from http://www.realtor.com/FindHome/default.asp, no date.

Realtor.com: Real Estate—Homes for Sale in New Jersey from http://www.realtor.com/newjersey/nbselnj.asp, no date.

(List continued on next page.)

Primary Examiner—Yonel Beaulieu
(74) Attorney, Agent, or Firm—Cooley Godward LLP

(57) ABSTRACT

A system and method for accessing real estate information over a communications network includes positioning a user at a desired piece of property. A database containing the real estate information is accessible over the communications network, preferably via a wireless device that includes location determination means for determining the geographic position of the user. The wireless device accesses the database via the communications network based upon the current geographic position, and the database returns information relating to the property located proximate to the geographic position of the wireless device.

18 Claims, 4 Drawing Sheets

OTHER PUBLICATIONS

Realtor.com: Real Estate—Homes for Sale in Atlantic City from http://www.realtor.com/atlanticcity/nbregion4.asp, no date.

Realtor.com: Find a Home—Select Property Type from http://www.realtor.com/PropType.asp?pgnum=1&st=nj&frm=bycomm&mls=atlanticcity&mlsttl=Atlantic+City&comm, no date.

Realtor.com: Real Estate in Bay Area from http://www.realtor.com/selectnb.asp?frm=bycomm&st=nj&mls=atlanticcity&mlsttl=Atlantic+City&comm=Bay+Area&, no date.

Realtor.com: Real Estate—Find a Neighborhood from http://www.realtor.com/FindNeig/default.asp, no date.

* cited by examiner

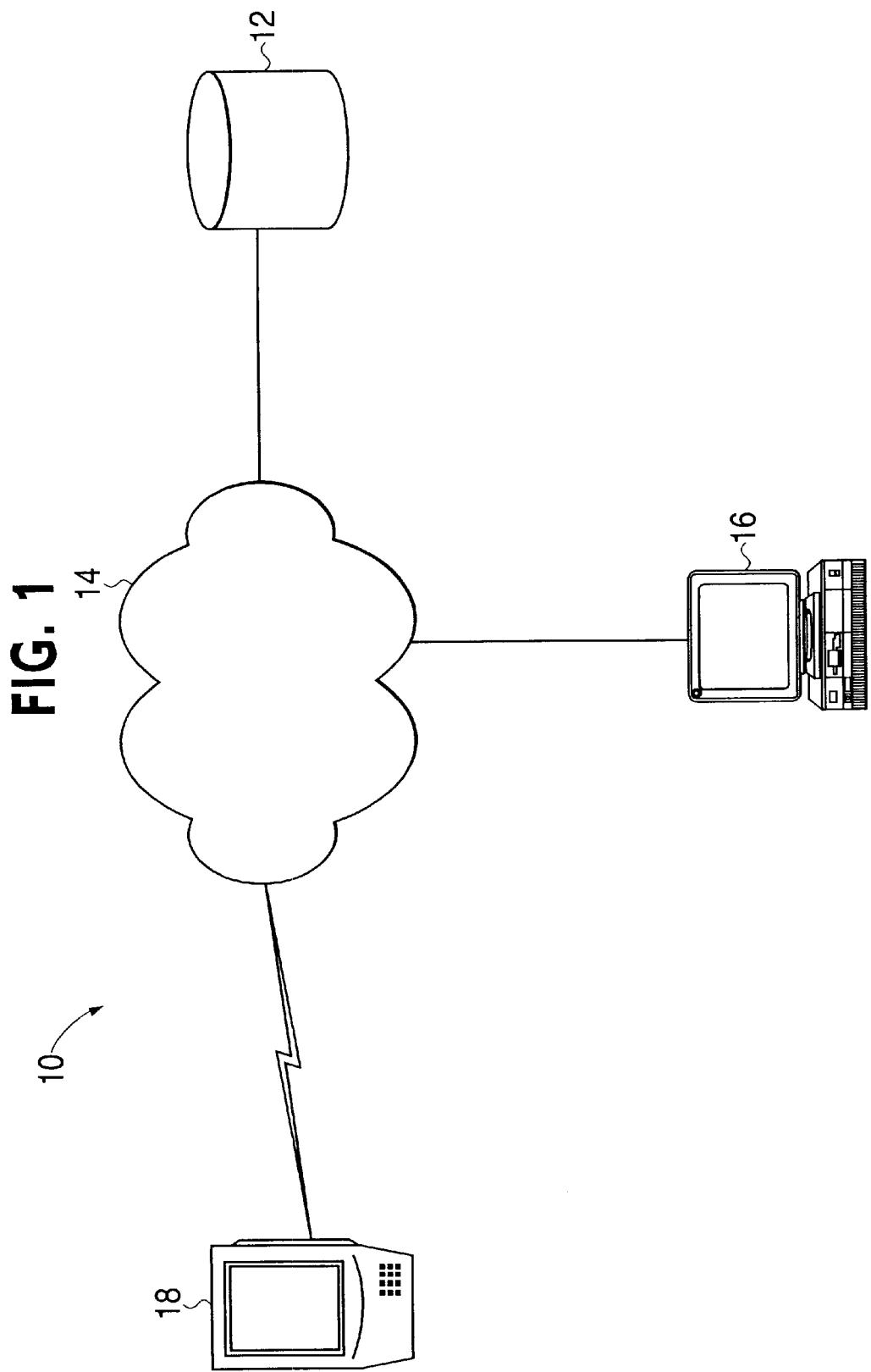

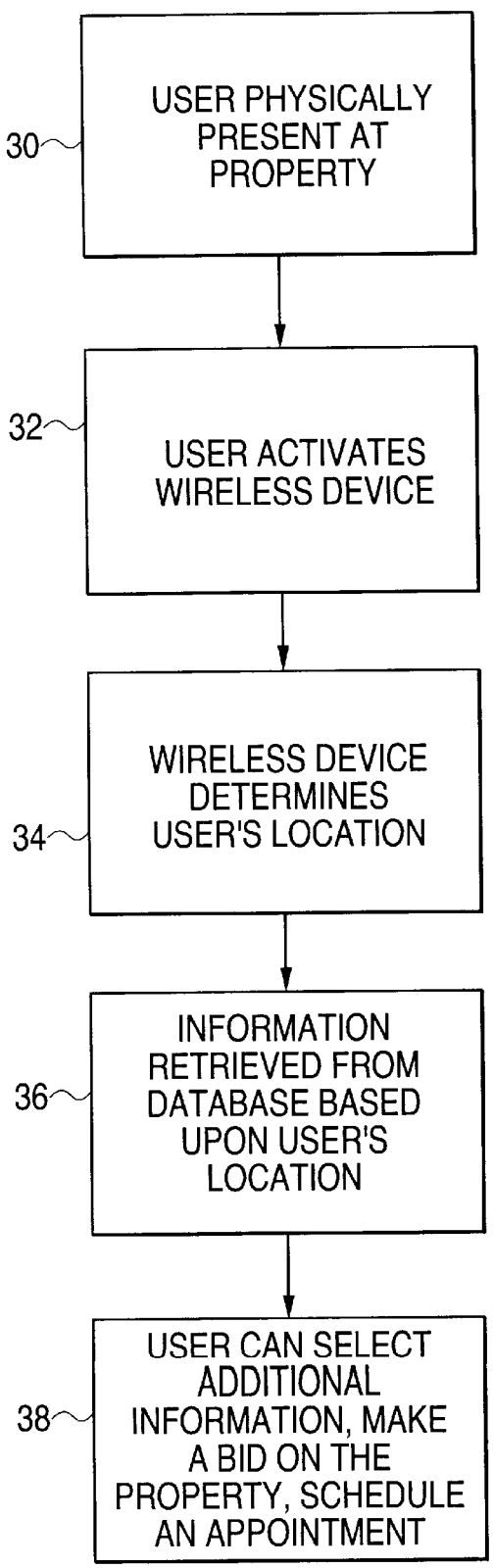

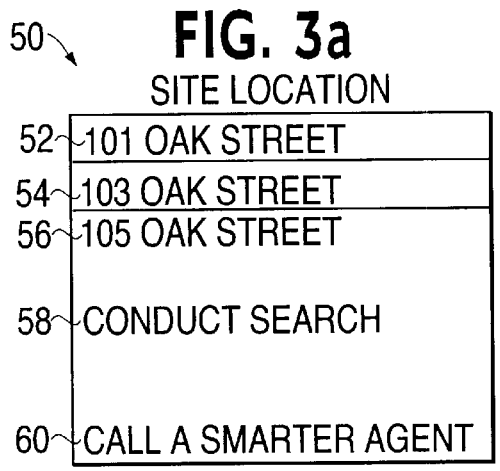
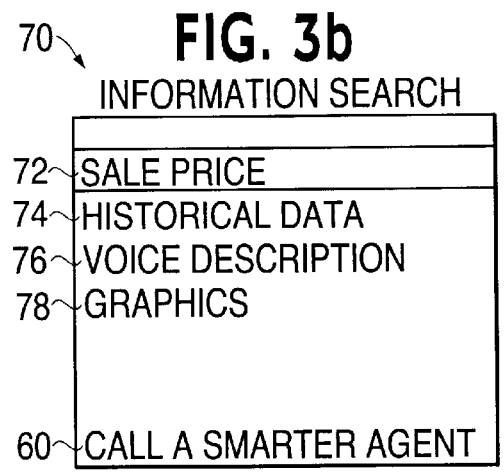
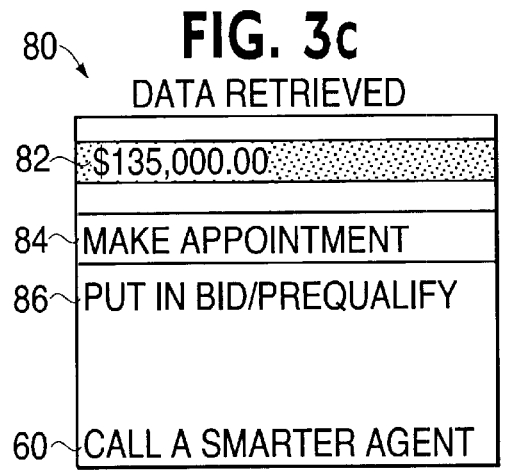
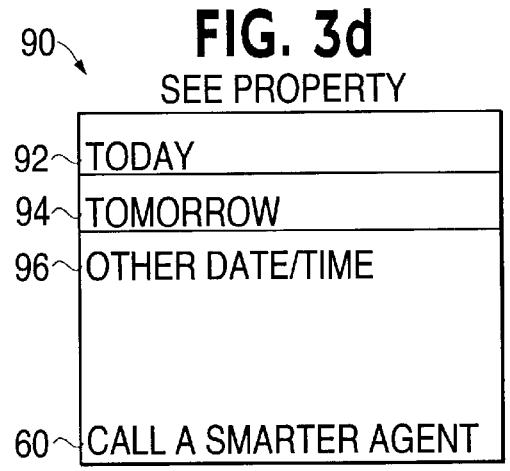

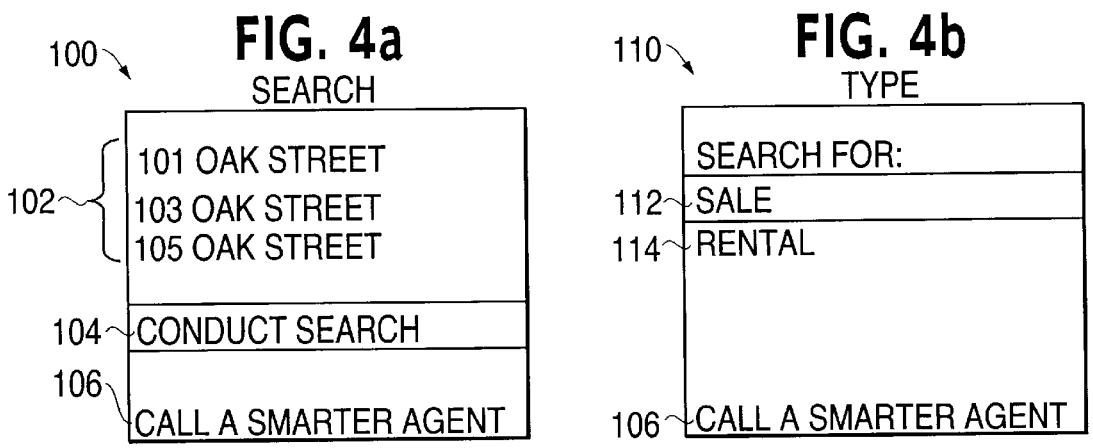
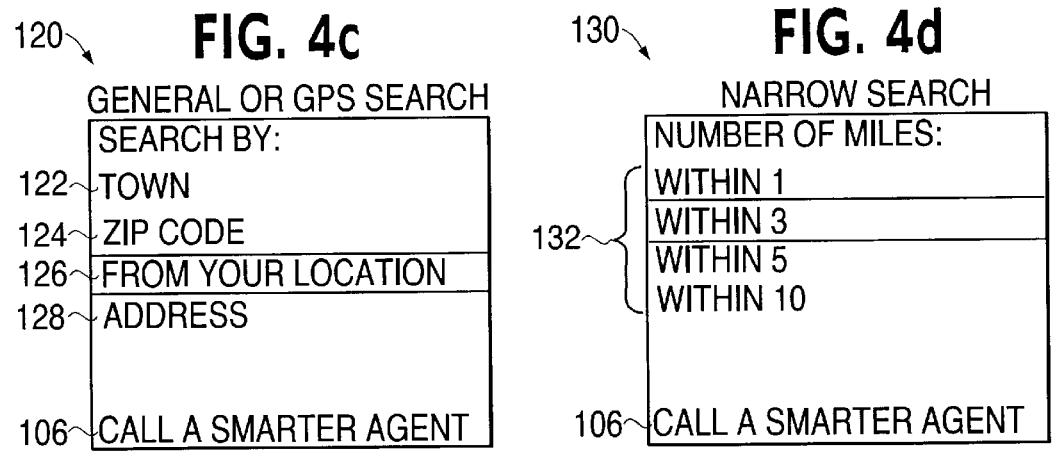
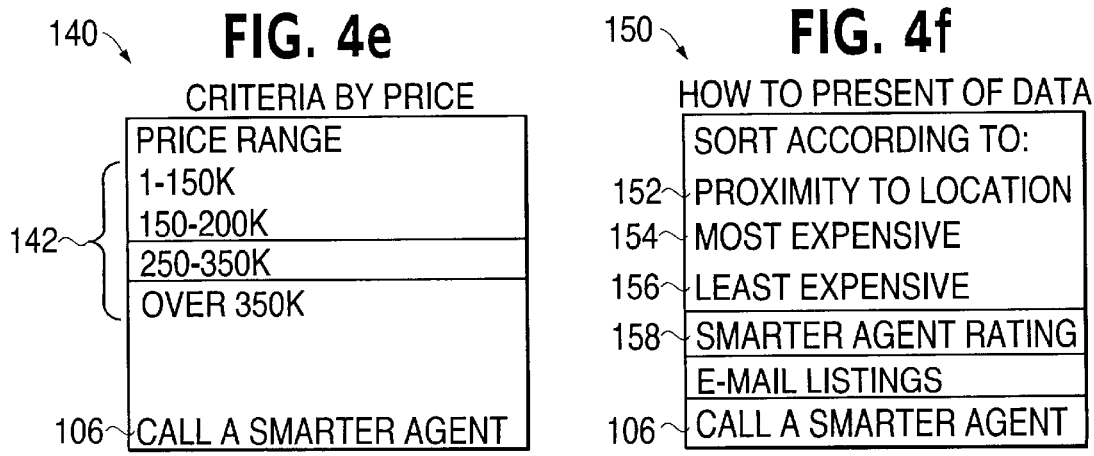

GLOBAL POSITIONING-BASED REAL ESTATE DATABASE ACCESS DEVICE AND METHOD

CLAIM OF PRIORITY

This application desires priority from co-pending Ser. No. 60/186,155 filed Feb. 29, 2000.

FIELD OF THE INVENTION

The present invention relates to a device for accessing a property-centric real estate database, and, more particularly, to a wireless device that uses global positioning data to access the real estate database based upon the property located near the user.

BACKGROUND OF THE INVENTION

The traditional method of buying real estate requires the prospective purchaser to transact through a real estate broker for virtually every aspect of the transaction, from finding a desired property to completing the sale. Often the most difficult part of the process, from the buyer's perspective, is locating a desired piece of real estate. There are generally two methods employed to locate a desired piece of property.

The first relies solely on the real estate broker to use his or her contacts/tools, i.e., mls (multiple listing service) network, to locate property that meets the buyer's specifications. The second is more random, in that if a buyer happens to pass a piece of property that is displaying a "for sale" sign, the buyer can write down the phone number shown on the sign to later inquire about the property, which then places the transaction totally within the broker's hands, as the broker controls all the information relating to the property (e.g., size and cost).

Over the last few years, various computer-related methods for locating real estate have been introduced. For example, U.S. Pat. No. 5,032,989 relates to a computerized map-based real estate search system in which a user can zoom in on a map to greater levels of detail, in order to obtain a more accurate view of the location of an available piece of property. The mapping system in the '989 patent is centered about a user-selectable landmark, and the different maps that are generated are also centered about the landmark. There is an associated property database which can be accessed remotely either by searching by specified criteria or by using the mapping system. Additionally, U.S. Pat. No. 5,852,810 covers an Internet-based, map-based real estate search system which operates in a similar manner as the '989 patent. The system disclosed in the '810 patent also permits a user to search criteria after narrowing the map-based search down to the city level, thereby allowing a criteria-based search in addition to a location-based search.

When accessing property information via a computer, it is often desirable to view the property at the same time. In this regard, U.S. Pat. No. 5,794,216 recites an interactive multimedia real estate database including interior images and exterior images of a house, the floor plan of the house, and a textual description of the property. Additionally, links are provided on the exterior image of the house that, if clicked, permit the user to view the interior of the corresponding room.

The foregoing patents require a user to be located at a computer, and remote from the property. The technology disclosed in these patents is not very effective when a buyer is driving past a particular piece of property and would like additional information about the property. It would be desirable for a prospective buyer to be able to access information relating to a piece of property as the buyer was present at the property, at any time of day, and whether or not the property displayed a "for sale" sign. This type of information is ideally suited to be transmitted via a wireless device.

U.S. Pat. No. 5,930,699 relates to an address retrieval system based on the position of a cellular telephone. A cell phone user can request information relating to businesses that are located in the proximity of the user, based upon the geographic position of the user as determined by pinpointing the location of the cell phone. Once the location of the user is determined, a database that is keyed on geographic location is searched, looking for businesses of the type requested by the user (e.g., restaurants, gas stations, hotels, etc.) that are located in the area around the user.

U.S. Pat. No. 5,938,721 discloses a mobile computer system having a built-in global positioning system (GPS) locator and an associated database that displays relevant information to the user based upon the user's current location. The database is accessed in real time as the user's position changes and is primarily focused on task-based information. For example, if a stored task is to buy milk, as the user approaches the grocery store, he or she is reminded to buy milk. This patent also discusses route planning between multiple stops, as well as a business-locating function similar to that described in the '699 patent.

SUMMARY OF THE INVENTION

A system for accessing real estate information over a communications network includes a database or multiple databases containing the real estate information, the database being accessible over the communications network; and a wireless device communicating with the communications network and including location determination means for determining the geographic position of the wireless device, whereby the wireless device accesses the database via the communications network based upon the geographic position of the wireless device, the database returning information relating to a property located proximate to the geographic position of the wireless device.

A method for accessing a real estate database over a communications network via a wireless device includes the steps of positioning a user at a desired piece of property; activating the wireless device; determining the geographic position of the user via the wireless device; accessing the database via the communications network based upon the geographic position of the user; and returning information relevant to the property over the communications network to the wireless device.

BRIEF DESCRIPTION OF THE DRAWINGS

For a better understanding of the present invention, reference is made to the following detailed description of an exemplary embodiment considered in conjunction with the accompanying drawings, in which:

FIG. 1 is a network overview of a system for accessing a real estate database constructed in accordance with the present invention;

FIG. 2 is a flowchart of the operation of the system shown in FIG. 1;

FIGS. 3a–3d are screen shots of information retrieval from the database via the wireless device shown in FIG. 1; and FIGS. 4a–4f are screen shots of a search of the database via the wireless device shown in FIG. 1.

DETAILED DESCRIPTION OF THE INVENTION

As shown in FIG. 1, a system 10 for accessing a real estate database includes a real estate database 12 that is connected to a communications network 14. The user may be an individual such as a real estate broker or a consumer. A computer terminal 16 is connected to the network 14 for accessing the database 12. Although only one computer 16 is shown in FIG. 1, the database 12 can be accessed simultaneously by a plurality of computers 16. A wireless device 18 can also connect to the network 14 in order to access the database 12. Preferably, the wireless device 18 is a hand-held electronic device including a global positioning system(GPS) locator which can be location-pinpointed using known means. Among the alternative means which may be used is CDMA cellular positioning technology from Qual Comm. Alternatively, the wireless device 18 can include a cellular telephone capable of receiving and displaying non-voice data and which can be location-pinpointed using known means. The device can also be a network hybrid device. The types of location methods for use in the present invention can comprise EOA, TOA, GPS cell ID and network-assisted GPS systems. The communications network 14 can be any type of communications network, such that the computer 16 and the wireless device 18, whether a hand-held electronic device or a cellular telephone, can both access the database 12. The network 14 is preferably the Internet, thereby permitting any device, wired or wireless, that uses the Internet Protocol standard to be able to access the database 12.

The database 12 is preferably an ODBC-complaint database, such that it is accessible via a variety of database programs. The database 12 includes a variety of different information regarding each property stored therein. In one embodiment, the database 12 includes textual data (e.g., sale price, historical sale data), and in others a recorded or live voice description or voice-activated prompts of a description of the property, such that this information can be retrieved by either the wireless device 18 or the computer 16. Preferably, the database 12 also includes photographs of the property, floor plans of any buildings on the property (in two-dimensional view), and three-dimensional views, animation, or video footage of the property, representing a virtual walk-through of the property. The accessibility of these graphical elements of the database 12 is dependent upon the display capabilities of the receiving device and the wireless network. Ideally, the database 12 is used in connection with a multiple listing service (MLS) to provide information on as large a number of properties as possible.

FIG. 2 is a flowchart showing the operation of the system 10 in connection with the wireless device 18. Beginning at step 30, a user is present at a property in which they are interested. Such a property need not be listed as being for sale; the user merely needs to be physically located at the property. The user then activates the wireless device 18 in step 32, and in step 34, the wireless device 18 determines the user's geographic position through known methods. Based upon the geographic position of the user, the wireless device 18 accesses the database 12 in step 36 and retrieves information relating to the property where the user is located at the time the database 12 is accessed. Note, that this process can also be used in reverse using a set of criteria to search for property, and with GPS activated directions to matching properties from the user's location. In step 38, the user can access additional information relating to the property, make a bid on the property, schedule an appointment to view the property, or search for additional properties, all through the wireless device 18. It is to be noted and stressed that the present invention may be used in conjunction with a wireless operating system such as the WAP internet protocol.

If the user is accessing the database 12 via the computer terminal 16 instead of the wireless device 18, the user will not be present at the property and can search the database 12 to locate a desired property. Preferably, a user of the computer terminal 16 will access the database 12 over the network 14 via a World Wide Web browser, such as Netscape Navigator® or Microsoft Internet Explorer™. The information in the database 12 can be transmitted to the computer terminal 16 in any browser-compatible format, such as HTML; software programs for transmitting and formatting the information are known in the art. This information can also be downloaded at the Internet site and forwarded to the wireless device to promote continuity of property search, study, e-mail alerts, and transaction capabilities.

When the user of the wireless device 18 is present at a desired property, he or she can retrieve information about the property, through screens like those shown in FIGS. 3a–3d. The first screen the user sees is a location screen 50, which contains a plurality of street addresses 52–56. Due to the imprecise nature of commercial GPS systems, the exact location of the user may be incorrect by several feet, and therefore, in order to compensate for the imprecision, the location screen 50 displays several possible addresses in the vicinity of the user (however, the list is not limited to three items as shown in FIG. 3a). Of the GPS location determination is sufficiently accurate to pinpoint a specific property, it is highlighted as shown at 54. If the highlighted property is not the one the user is interested in, the user can select one of the other listed properties 52, 56. The conduct search option 58 will be discussed below in connection with FIGS. 4a–4f. If the user would like to receive assistance at any time during the information retrieval process, the user can select to call an agent item 60, and the user will be connected to a call center or Realtor-connected office to receive additional instruction or information. The call agent item 60 is accessible from any of the information retrieval screens.

After the user selects the desired property (shown at 54 in FIG. 3a), an information selection screen 70 as shown in FIG. 3b is displayed. The information screen 70 contains a menu with selections such as sale price 72, historical data 74, voice description 76, and graphics 78. The list can be expanded beyond these four options, such as for analysis, valuation, financing or other tools relating to the real estate transaction. Selecting the sale price item 72 will show the user the current sale price for the property, as will be discussed below. Choosing the historical data item 74 will show the user the historical sale prices for the property, in order to assess the property's appreciation over time. Electing the voice description option 76 will play back a spoken description of the property or live help. Lastly, selecting the graphics item 78 will display any available graphics (e.g., floor plans, exterior or interior views, or walkthroughs) relating to the property.

If the user selects the sale price item 72, a retrieved. data screen 80 will be displayed and is shown in FIG. 3c. The retrieved data screen includes the sale price 82, an option to make an appointment 84 to view the property, and the ability to place a bid 86 on the property. Assuming the user selects the make appointment item 84, the user will seen an appointment scheduling screen 90 as shown in FIG. 3d. From the scheduling screen 90, the user can choose from pre-selected appointment times such as today 92, tomorrow 94, or schedule a different appointment time 96. If the user selects the bid item 86, the user will be prompted to enter a bid amount, which will be transmitted back to the database 12.

FIGS. 4a–4f show the screen shots on the wireless device 28 when the user desires to search for a particular piece of property. Referring to FIG. 4a, which is shown after the user's location has been determined via GPS, a search screen 100 is shown and includes a list 102 of street addresses of nearby properties and a conduct search item 104. If the user would like to receive assistance at any time during the search process, the user can select the call an agent item 106, and the user will be connected to a call center or Realtor-connected office to receive additional instruction or information. The call agent item 106 is accessible from any of the search screens.

The user enters the search process after selecting the conduct search item 104, and is shown a property type screen 110 (FIG. 4b). The remainder of the discussion regarding the search function relates to a user searching for a residential property. The search function is also applicable to a search for commercial property; the main differences being some of the options available in the screen shots shown in FIGS. 4b and 4e. As shown in FIG. 4b, the property type screen includes options for sale property 112 and rental property 114. After selecting the property type, the user is shown a search type screen 120 as illustrated in FIG. 4c. The search type screen 120 displays a menu of search options, including search by town 122, search by zip code 124, search by present location 126, and search by street address 128.

Assuming that the user chooses the search by present location item 126, a narrow search screen 130 (FIG. 4d) is displayed, from which the user can narrow the geographic scope of the search by selecting a predefined radius 132. Next, the user selects the price range for the property from a price search screen 140, as shown in FIG. 4e. The price search screen 140 presents a list 142 of price ranges; the list 142 shown in FIG. 4e is an arbitrary breakdown by price, and can be refined to include additional price categories. If the user selects one of the other search types 122, 124, 128, the user will be prompted to enter the information necessary to complete the search. The entered information will then be transmitted back to the database 12.

FIG. 4f shows a sort screen 150 which permits the user to select the order in which he or she wishes to review the search results. The same sort screen 150 is shown regardless of the search type 122–128 selected by the user. The results can be sorted by proximity to the user's present location 152, in descending order starting with the most expensive property 154, in ascending order beginning with the least expensive property 156, and by property rating 158. The property rating 158 is a proprietary rating determined on the basis of the condition of the property, the location of the property, and the list price of the property.

It will be understood that the embodiment described herein is merely exemplary and that a person skilled in the art may make many variations and modifications without departing from the spirit and scope of the present invention. All such variations and modifications are intended to be included within the scope of the invention as defined in the appended claims.

What is claimed is:

1. A system for accessing real estate information over a communications network, comprising:

a database containing real estate information and property location information related to a geographic position, said database being accessible over the communications network; and a wireless device communicating with said database over the communications network and including location determination means for determining the geographic position of said wireless device, whereby said database accesses said property location information via the communications network based upon the geographic position provided by said wireless device, said database returning said real estate information to said wireless device, said returned real estate information relating to a property located proximate to the geographic position of said wireless device.

2. A method for accessing a real estate database over a communications network via a wireless device, comprising:

positioning a user at a desired piece of property;

activating the wireless device;

determining a geographic position of the user via the wireless device;

accessing the real estate database via the communications network based upon the geographic position of the user; and returning information relevant to the desired piece of property over the communications network to the wireless device.

3. The method of claim 2, wherein said returning information relevant to the desired piece of property includes returning real estate information.

4. The method of claim 2, further comprising:

querying the user for input based on said returned information;

receiving input from the user based on querying the user; and providing additional real estate information regarding the property based upon the input received.

5. A real estate information system, comprising:

a database including information about a plurality of properties, said information including real estate information and property location information, said database being accessible over a communications network, said database being accessible by a wireless device configured to communicate with the communications network and including a location determining device configured to determine a geographic position of the wireless device, said database communicating at least a portion of said real estate information to said wireless device, said communicated portion of said real estate information relating to a property located proximate to the determined geographic position.

6. The real estate information system of claim 5, wherein said database contains real estate information and property location information related to a plurality of geographic positions.

7. A method of retrieving real estate information, comprising:

providing over a communications network a geographic position of a wireless device to a real estate information system, said information system including information about a property, said information including real estate information and property location information; and receiving said location information and said real estate information from said real estate information system, said real estate information related to a property proximate to the geographic position.

8. The method of claim 7, wherein said receiving real estate information includes receiving information describing at least one of sale price, realtor, floor plan, physical description, or owner contact information.

9. The method of claim 7, wherein said providing information related to a geographic position includes:
   providing geographic position information from the Global Positioning System.

10. The method of claim 7, wherein said providing information related to a geographic position includes:
    providing geographic position information over at least a portion of a wireless network.

11. The method of claim 7, wherein said providing information related to a geographic position includes:
    providing geographic position information, said geographic position information being determined by the wireless device.

12. The method of claim 7, wherein said providing information related to a geographic position includes:
    providing geographic position information, said geographic position information first being received by the wireless device.

13. A method of providing real estate information from a real estate information system to a wireless device, the method comprising:
    receiving geographic position information from the wireless device that identifies a geographic position of the wireless device;
    accessing a database including location information and real estate information related to a property using the geographic position information; and
    transmitting to the wireless device said real estate information related to a property proximate to said geographic position.

14. A wireless device for obtaining real estate information, comprising:
    a transmitter operable with a position determining system that provides geographic position information including a geographic position of the wireless device to an information system, the information system including information about a property, said information including real estate information and property location information;
    a receiver that receives said real estate information based on said geographic position from said information system.

15. The wireless device of claim 14, further comprising:
    a display configured to display said real estate information received from said information system.

16. The wireless device of claim 14, further comprising:
    an audio device configured to output said real estate information from said information system.

17. A method of accessing a database including information about properties with a wireless device, said information including real estate information and property location information, the method comprising:
    determining the geographic position of the wireless device;
    retrieving real estate information for one of the properties in the database using the geographic position of the wireless device to access the information about the properties via the property location information.

18. Computer executable software code stored on a computer readable medium operable with a wireless device, the code for:
    providing a geographic position associated with the wireless device to a real estate information system having real estate information and location information; and
    receiving said real estate information from said real estate information system, said real estate information related to a property proximate to the geographic position, said real estate information retrieved by said real estate information system using said location information.

* * * * *

(12) INTER PARTES REEXAMINATION CERTIFICATE (1169th)
United States Patent
Blumberg et al.

(10) Number: US 6,385,541 C1
(45) Certificate Issued: Sep. 21, 2015

(54) GLOBAL POSITIONING-BASED REAL ESTATE DATABASE ACCESS DEVICE AND METHOD

(75) Inventors: Brad Wayne Blumberg, Voorhees, NJ (US); Eric Blumberg, Ventnor, NJ (US)

(73) Assignee: SOVEREIGN BANK, Philadelphia, PA (US)

Reexamination Request:
No. 95/001,435, Aug. 31, 2010

Reexamination Certificate for:
Patent No.: 6,385,541
Issued: May 7, 2002
Appl. No.: 09/639,265
Filed: Aug. 15, 2000

Related U.S. Application Data

(60) Provisional application No. 60/186,155, filed on Feb. 29, 2000.

(51) Int. Cl.
*G01C 21/20* (2006.01)
*H04Q 7/22* (2006.01)
*H04L 29/08* (2006.01)
*H04L 29/06* (2006.01)
*G09B 9/00* (2006.01)
*H04W 4/02* (2009.01)

(52) U.S. Cl.
CPC ............... *G09B 9/003* (2013.01); *H04L 67/18* (2013.01); *H04W 4/02* (2013.01)

(58) Field of Classification Search
None
See application file for complete search history.

(56) References Cited

To view the complete listing of prior art documents cited during the proceeding for Reexamination Control Number 95/001,435, please refer to the USPTO's public Patent Application Information Retrieval (PAIR) system under the Display References tab.

*Primary Examiner* — Scott L Weaver

(57) ABSTRACT

A system and method for accessing real estate information over a communications network includes positioning a user at a desired piece of property. A database containing the real estate information is accessible over the communications network, preferably via a wireless device that includes location determination means for determining the geographic position of the user. The wireless device accesses the database via the communications network based upon the current geographic position, and the database returns information relating to the property located proximate to the geographic position of the wireless device.

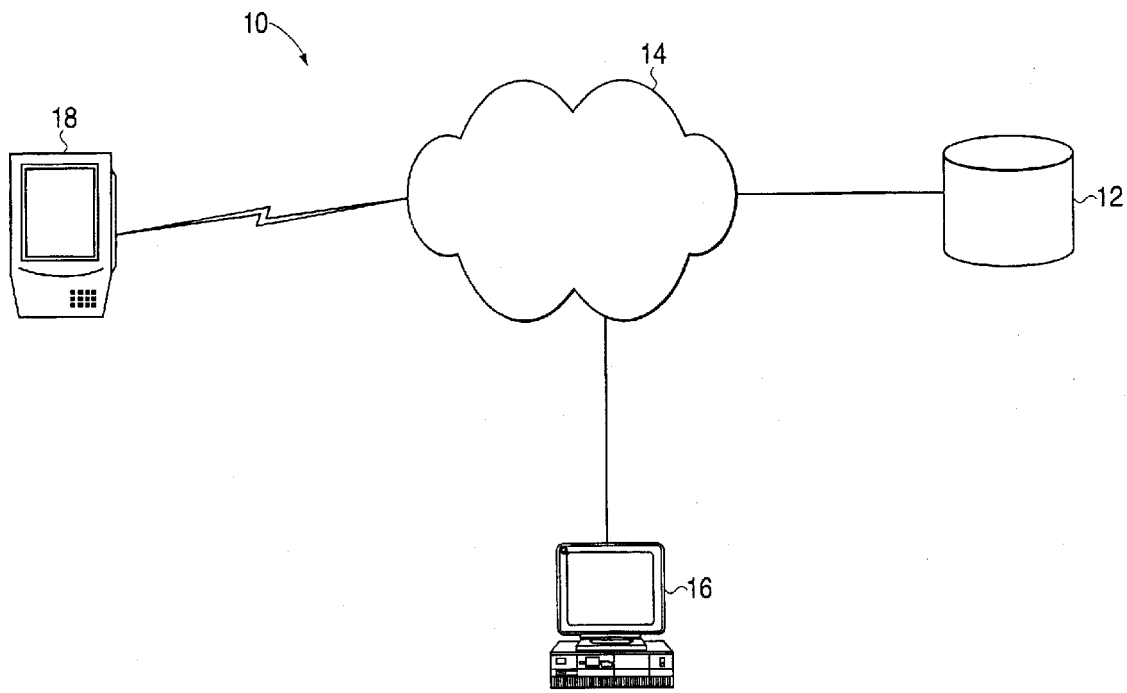

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *